United States Patent
Gajic et al.

(10) Patent No.: US 10,364,666 B2
(45) Date of Patent: Jul. 30, 2019

(54) OPTIMIZED DIRECTIONAL DRILLING USING MWD DATA

(71) Applicant: Nabors Drilling Technologies USA, Inc., Houston, TX (US)

(72) Inventors: Bosko Gajic, Kingwood, TX (US); Matthew White, Spring, TX (US); Mahmoud Hadi, Richmond, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 233 days.

(21) Appl. No.: 15/590,784

(22) Filed: May 9, 2017

(65) Prior Publication Data
US 2018/0328164 A1    Nov. 15, 2018

(51) Int. Cl.
| | |
|---|---|
| E21B 47/022 | (2012.01) |
| E21B 7/06 | (2006.01) |
| E21B 17/02 | (2006.01) |
| E21B 47/12 | (2012.01) |
| G01V 11/00 | (2006.01) |
| E21B 47/024 | (2006.01) |

(Continued)

(52) U.S. Cl.
CPC ........ *E21B 47/02216* (2013.01); *E21B 7/068* (2013.01); *E21B 17/028* (2013.01); *E21B 47/024* (2013.01); *E21B 47/122* (2013.01); *G01V 11/005* (2013.01); *E21B 7/04* (2013.01); *E21B 17/00* (2013.01)

(58) Field of Classification Search
CPC .. E21B 47/02216; E21B 7/068; E21B 17/028; E21B 47/024; E21B 47/122; E21B 7/04; E21B 17/00; E21B 47/02224; E21B 44/00; E21B 44/04; G01V 11/005
See application file for complete search history.

(56) References Cited

U.S. PATENT DOCUMENTS

| | | |
|---|---|---|
| 5,456,106 A | 10/1995 | Harvey et al. |
| 7,802,634 B2 | 9/2010 | Boone |
| 8,827,006 B2 | 9/2014 | Moriarty |

(Continued)

FOREIGN PATENT DOCUMENTS

WO    WO 2015/112871 A1    7/2015

OTHER PUBLICATIONS

U.S. Appl. No. 15/478,265, filed Apr. 4, 2017, Hadi et al.
U.S. Appl. No. 15/478,724, filed Apr. 4, 2017, Hadi.

*Primary Examiner* — Michael R Wills, III
(74) *Attorney, Agent, or Firm* — Haynes and Boone, LLP (57) ABSTRACT

Systems and methods for directional drilling are described. The system includes one or more controllers and is configured to receive data from a plurality of downhole sensors, provide operational control signals, determine a relationship between different parameters, receive current data including at least one of current differential pressure (DP), weight-on-bit (WOB), or rotations per minute (RPM) of a drill bit, and estimate at least one of current toolface orientation or current shock and vibration of the drill bit using the current data and the determined relationship. The system is further configured to provide operational control signals that may adjust the current toolface orientation to a desired toolface orientation. Current WOB and/or current RPM are adjusted to minimize current shock and vibration of a portion of a bottom hole assembly (BHA).

21 Claims, 4 Drawing Sheets

(51) Int. Cl.
*E21B 7/04* (2006.01)
*E21B 17/00* (2006.01)

(56) References Cited

U.S. PATENT DOCUMENTS

| | | | |
|---|---|---|---|
| 8,893,821 B2 | 11/2014 | Schwefe | |
| 9,347,308 B2 | 5/2016 | Benson et al. | |
| 2007/0247328 A1* | 10/2007 | Petrovic | G01V 11/002 340/853.7 |
| 2010/0139981 A1* | 6/2010 | Meister | E21B 7/04 175/61 |
| 2010/0175922 A1* | 7/2010 | Ignova | E21B 7/04 175/24 |
| 2013/0126241 A1* | 5/2013 | Boone | E21B 7/068 175/45 |
| 2013/0341092 A1* | 12/2013 | Hay | E21B 7/04 175/24 |
| 2014/0367170 A1* | 12/2014 | Hoehn | E21B 47/024 175/45 |
| 2015/0107899 A1* | 4/2015 | Fisher, Jr. | E21B 49/003 175/27 |
| 2017/0370151 A1* | 12/2017 | Banirazi-Motlagh | G05B 15/02 |

\* cited by examiner

OPTIMIZED DIRECTIONAL DRILLING USING MWD DATA

TECHNICAL FIELD

The present disclosure is directed to systems, devices, and methods for directional drilling. More specifically, the present disclosure is directed to systems, devices, and methods for drilling in general and more specifically directional drilling using data from a measurement-while-drilling (MWD) tool.

BACKGROUND OF THE DISCLOSURE

Subterranean "sliding" drilling operation typically involves rotating a drill bit on a downhole motor at the remote end of a drill pipe string during a drilling operation. Drilling fluid forced through the drill pipe and downhole motor rotates the drill bit. The assembly is directed or "steered" from a vertical drill path in any number of directions, allowing the operator to guide the wellbore to desired underground locations. For example, to recover an underground hydrocarbon deposit, the operator may drill a vertical well to a point above the reservoir and then steer the wellbore to drill a deflected or "directional" well that penetrates the deposit. The well may pass horizontally through the deposit. Friction between the drill string and the wellbore generally increases as a function of the horizontal component of the wellbore, and slows drilling by reducing the force that pushes the bit into new formations.

Such directional drilling requires accurate orientation of a bent segment of the downhole motor that drives the bit. Rotating the drill string and adjusting the angular position of the pipe at the surface using a top drive or rotary table change the orientation of the bent segment called the toolface. To effectively steer the assembly, the operator must first determine the current toolface orientation, such as via measurement-while-drilling (MWD) apparatus. Thereafter, if the drilling direction needs adjustment, the operator must rotate the drill string to change the toolface orientation.

As various drilling parameters, such as weight on bit, flow rate, amount of bite the bit is making in the formation, rate of penetration, and/or other parameters change, the toolface position will be changing as well. It is desirable to accurately control the toolface position and keep the toolface in one position to allow for overall better steering control and a smoother wellbore. Traditionally, toolface feedback has been done manually by waiting for the MWD apparatus to communication (e.g., telemeter) the current toolface position to surface. The directional driller would then make any corresponding changes to the quill position to offset the error in the toolface as compared to the desired toolface. Such a control feedback loop is very slow and allows for a large amount of toolface position error while drilling, resulting in less than desirable steering control and wellbore consistency, ultimately resulting in longer "sliding" times and a reduced rate of penetration (ROP), and thus increasing the cost of the drilling process.

Automating toolface control while sliding can utilize a differential pressure (DP) measurement at the surface of the drilling rig to estimate toolface changes more quickly than can be telemetered by a downhole MWD tool. This allows for faster feedback to the control loop that can improve algorithms that control toolface orientation.

One problem with this method is that the relationship between DP and toolface changes depending on a variety of factors, such as depth and geometry of the drill string and formation, motor performance, bit performance, flow rate, and weight on bit. In order to estimate the expected change in toolface position relative to a change in differential pressure, an experienced directional driller is typically required to create a table to define this relationship, and the performance of the system is limited by the accuracy of the directional driller's estimation(s).

Thus, drilling a well typically involves a substantial amount of human decision making and/or analysis of relationships of various parameters during the drilling process. While a directional driller may have drilled other boreholes in the same region and so may have some similar experience, it is impossible for a human to mentally track all the possible inputs and factor those inputs into a decision. This can result in expensive mistakes, as errors in drilling can increase drilling costs and/or time.

Reorienting the toolface in a wellbore can be very complex, labor intensive, and often inaccurate, and thus, automated methods and systems are desired. This becomes increasingly true as wells are drilled faster and thus ROP levels increase due to greater added power.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The systems, devices, and methods described herein are directed to the use of measurement data from a downhole MWD tool to identify and formulate relationships between various parameters of the drilling rig and bottom hole conditions. In an exemplary embodiment, a relationship between differential pressure (DP) and toolface orientation can be determined based on data taken from a MWD tool. In other embodiments, a relationship between weight-on-bit (WOB) and shock and vibration, a relationship between rotations or revolutions per minute (RPM) of the drill bit and shock and vibration, or both, are determined based on data from a MWD tool. For example, the MWD tool can facilitate the identification of the optimal WOB or RPM values to minimize one or more of shock and vibration, stick-slip, or any other parameter that indicates poor drilling performance or potential damage to the BHA. The MWD tool can measure certain parameters, determine relationships between them, and transmit them to the drilling rig to provide or update a control algorithm. In certain embodiments, critical values and/or relationships of one or more parameters are transmitted to the drilling rig to update and/or optimize a control system for the rig equipment. The term "and/or" as used herein typically means one or more of the noted items, or any combination thereof.

The systems, devices, and methods disclosed herein provide increased control of a bottom hole assembly (BHA), resulting in increased BHA responsiveness and faster BHA operations compared to conventional systems that require significantly more manual input or pauses to provide for input. The invention can advantageously achieve this through recurring or on-going data retrieval, processing received data, use of feedback, and optimizing parameters.

Embodiments of the present disclosure may utilize multiple sensors to send parameters of the drilling rig during operation. A speed of the top drive or drill bit, such as RPM, may be fed to a controller receiving other measurement data. The other measurement data may include WOB data and DP data, to name some examples.

Figure 1:
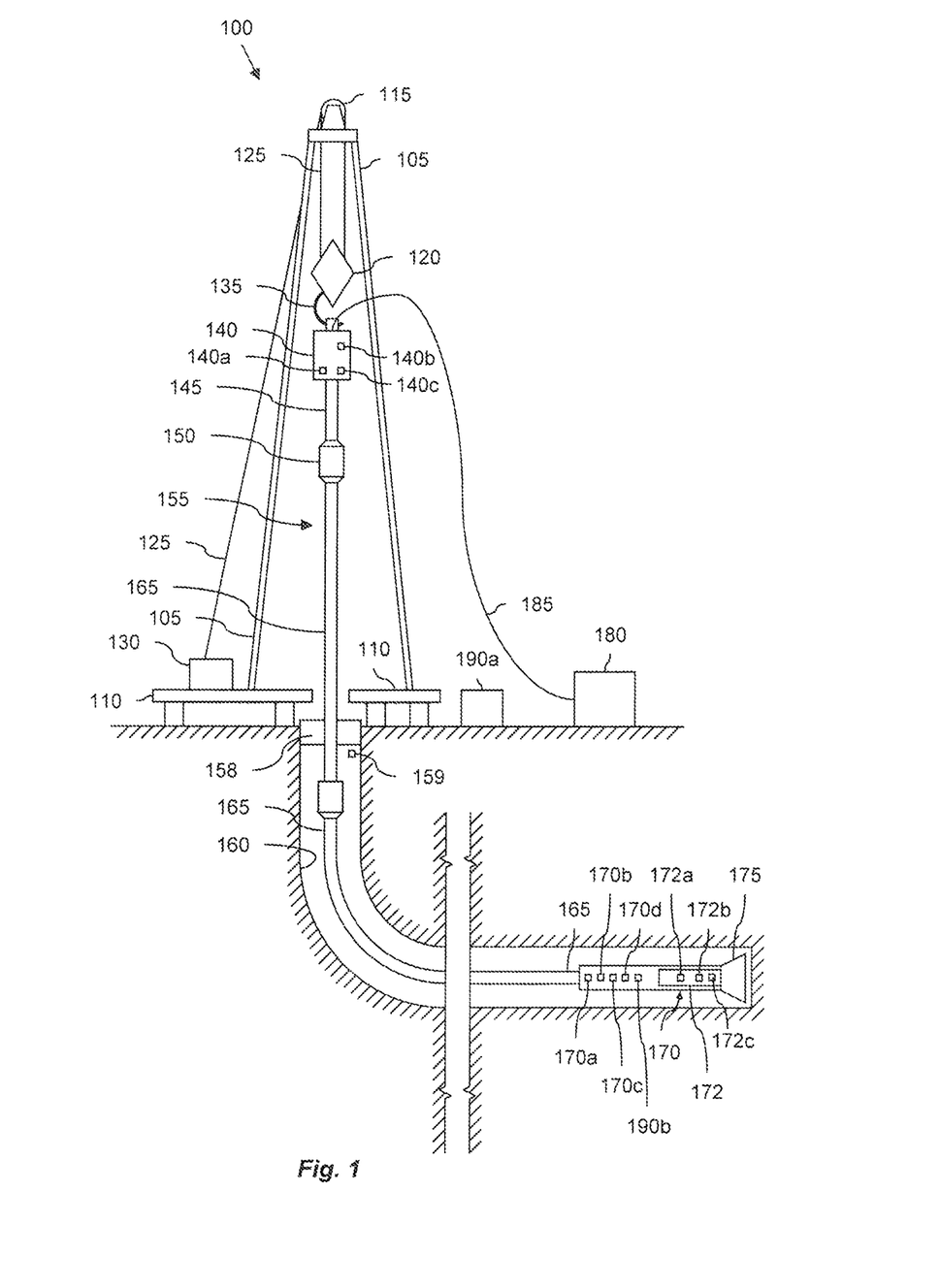
FIG. 1 is a diagram of an apparatus shown as an exemplary drilling rig according to one or more aspects of the present disclosure.

Referring to FIG. 1, illustrated is a diagram of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel out and reel in the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly.

The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165, a BHA 170, and a drill bit 175. The BHA 170 may include stabilizers, drill collars, or MWD or wireline conveyed instruments, among other components, or any combination thereof. The drill bit 175, which may also be referred to herein as a tool, is connected to the bottom of the BHA 170 or is otherwise attached to the drill string 155. One or more pumps 180 may deliver drilling fluid to the drill string 155 through a hose or other conduit 185, which may be connected to the top drive 140.

The downhole MWD or wireline conveyed instruments may be configured for the evaluation of physical properties such as pressure, temperature, torque, WOB, shock and vibration, inclination, azimuth, toolface orientation in three-dimensional space, or other downhole parameters, or any combination thereof. These measurements may be made downhole, stored in solid-state memory for some time, and downloaded from the instrument(s) at the surface, or transmitted in real-time to the surface, or any combination thereof. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, or transmission as electromagnetic pulses or by other techniques, or any combination thereof. The MWD tools and/or other portions of the BHA 170 may have the ability to store measurements for later retrieval via wireline and/or when the BHA 170 is tripped out of the wellbore 160.

In an exemplary embodiment, the apparatus 100 may also include a rotating blow-out preventer (BOP) 158, such as if the well 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 158. The apparatus 100 may also include a surface casing annular pressure sensor 159 configured to detect the pressure in the annulus defined between, for example, the wellbore 160 (or casing therein) and the drill string 155.

In the exemplary embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, or a conventional rotary rig, among others, or any combination thereof.

The apparatus 100 also includes controllers 190a and 190b configured to control or assist in the control of one or more components of the apparatus 100. For example, one or more of the controllers 190a or 190b may be configured to transmit operational control signals to the drawworks 130, the top drive 140, the BHA 170 or the pump 180, or any combination thereof. The controller 190a may be a stand-alone component installed near the mast 105 and/or other components of the apparatus 100 while the controller 190b may be located on the BHA 170. In an exemplary embodiment, the controller 190a includes one or more systems located in a control room proximate the apparatus 100, such as the general purpose shelter often referred to as the "doghouse" serving as a combination tool shed, office, communications center, and general meeting place. Other embodiments may locate the controller 190a in other locations (e.g., off-site) and/or controller 190a may be configured to receive inputs from operators located nearby the controller 190a and/or remote from the controller 190a. For the purposes of this disclosure, reference may be made to a controller 190. Such a controller 190 may include one or both of controllers 190a and 190b. Such a controller 190 may be configured to transmit the operational control signals to the drawworks 130, the top drive 140, the BHA 170, or the pump 180, or any combination thereof, via wired or wireless transmission means which, for the sake of clarity, are not depicted in FIG. 1.

The controllers 190a or 190b, or both, are also configured to receive electronic signals via wired or wireless transmission means (also not shown in FIG. 1) from a variety of sensors included in the apparatus 100, where each sensor is configured to detect an operational characteristic or parameter. The apparatus 100 may include an internal pipe pressure sensor 170a coupled to or otherwise associated with the BHA 170. The internal pipe pressure sensor 170a may be located above the mud motor and one or more sensors may obtain an annulus measurement also above the mud motor. Such measurements may be used to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on). The differential pressure may be calculated from such readings by, for example, assuming the pressure drop from the bit and annulus will be small and consistent compared with the changes in pressure drop related to mud motor loading. In certain other embodiments, internal pipe measurements directly above and below the mud motor may be received to determine differential pressure.

It is noted that the meaning of the word "detecting," in the context of the present disclosure, may include detecting, sensing, measuring, calculating, or any combination thereof, or otherwise obtaining data. Similarly, the meaning of the word "detect" in the context of the present disclosure may include detect, sense, measure, calculate, or any combination thereof, or otherwise obtain data.

The apparatus 100 may additionally or alternatively include a shock/vibration sensor 170b that is configured for detecting shock, vibration, or both, in the BHA 170. The apparatus 100 includes a mud motor delta pressure (ΔP) sensor 172a that is configured to detect a pressure differential value or range across one or more motors 172 of the BHA 170. The one or more motors 172 may each be or include a positive displacement drilling motor that uses hydraulic power of the drilling fluid to drive the bit 175, also known as a mud motor. One or more torque sensors 172b may also be included in the BHA 170 for sending data to the controllers 190a or 190b, or both, that is indicative of the torque applied to the bit 175 by the one or more motors 172. One or more speed sensors 172c configured to detect a value or range of the rotational speed of the bit 175 may also be included in the BHA 170.

The apparatus 100 may additionally or alternatively include a toolface sensor 170c configured to detect the current toolface orientation. The toolface sensor 170c may be or include a conventional or future-developed magnetic toolface sensor which detects toolface orientation relative to magnetic north or true north. Alternatively, or additionally, the toolface sensor 170c may be or include a conventional or future-developed gravity toolface sensor which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotational speed of the quill 145.

The top drive 140, drawworks 130, crown or traveling block, drilling line or dead line anchor may additionally or alternatively include or otherwise be associated with a WOB sensor 140c (WOB calculated from a hook load sensor that can be based on active and static hook load) (e.g., one or more sensors installed somewhere in the load path mechanisms to detect and calculate WOB, which can vary from rig-to-rig) different from the WOB sensor 170d. The WOB sensor 140c may be configured to detect a WOB value or range, where such detection may be performed at the top drive 140, drawworks 130, or other component of the apparatus 100.

The detection performed by the sensors described herein may be performed once, continuously, periodically, and/or at random intervals. Such detection may be performed by, for example, one or more sensors of the BHA 170 and the output from the sensors may be used to calculate relationships between the toolface and the differential pressure. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

Figure 2:
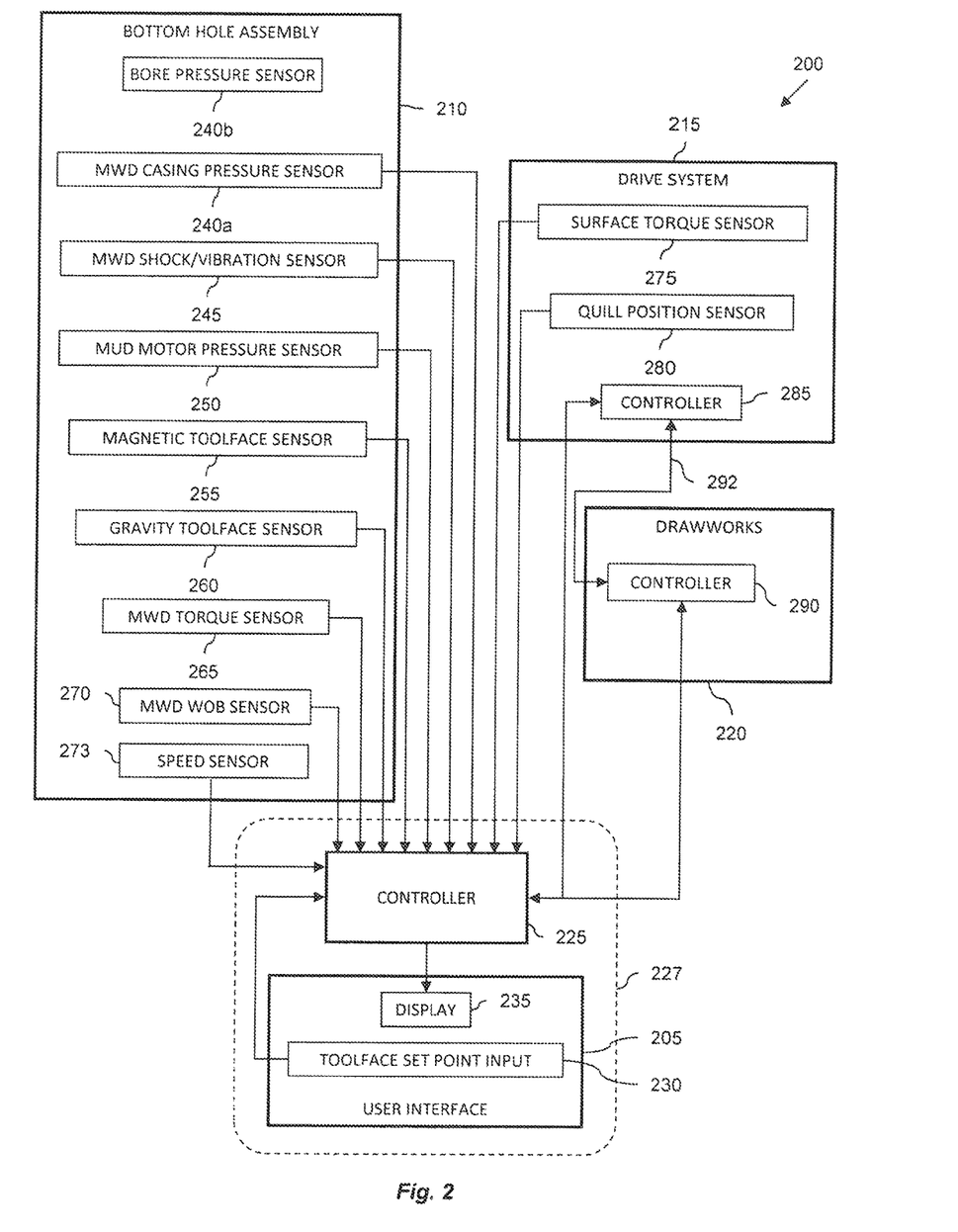
FIG. 2 is a block diagram of an apparatus shown as an exemplary control system according to one or more aspects of the present disclosure.

Referring now to FIG. 2, illustrated is a block diagram of an apparatus 200 according to one or more aspects of the present disclosure. The apparatus 200 includes a user interface 205, a BHA 210, a drive system 215, a drawworks 220, and a controller 225. The apparatus 200 may be implemented within the environment and/or apparatus shown in FIG. 1. For example, the BHA 210 may be substantially similar to the BHA 170 shown in FIG. 1, the drive system 215 may be substantially similar to the top drive 140 shown in FIG. 1, the drawworks 220 may be substantially similar to the drawworks 130 shown in FIG. 1, and/or the controller 225 may be substantially similar to the controller 190 shown in FIG. 1. The apparatus 200 may also be utilized in performing the method 300 shown in FIG. 3, among other methods described herein or otherwise within the scope of the present disclosure.

The user-interface 205 and the controller 225 may be discrete components that are interconnected via wired or wireless means. Alternatively, the user-interface 205 and the controller 225 may be integral components of a single system or controller 227, as indicated by the dashed lines in FIG. 2.

The user-interface 205 includes means 230 for user-input of one or more toolface set points, and may also include means for user-input of other set points, limits, and other input data. The data input means 230 may include a keypad, voice-recognition apparatus, dial, button, switch, slide selector, toggle, joystick, mouse, data base and/or other conventional or future-developed data input device. Such data input means may support data input from local and/or remote locations. Alternatively, or additionally, the data input means 230 may include means for user-selection of predetermined toolface set point values or ranges, such as via one or more drop-down menus. The toolface set point data may also or alternatively be selected by the controller 225 via the execution of one or more database look-up procedures. In general, the data input means 230 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other means.

The user-interface 205 may also include a display 235 for visually presenting information to the user in textual, graphic, or video form. The display 235 may also be utilized by the user to input the toolface set point data in conjunction with the data input means 230. For example, the toolface set point data input means 230 may be integral to or otherwise communicably coupled with the display 235.

The BHA 210 may include a MWD casing pressure sensor 240a that is configured to detect an annular pressure value or range at or near the MWD portion of the BHA 210, and that may be substantially similar to the pressure sensor 170a shown in FIG. 1. Additionally, BHA 210 may include a bore pressure sensor 240b that is configured to detect a pressure value of the bore. The casing pressure data detected via the MWD casing pressure sensor 240a the bore pressure sensor 240b may be sent via electronic signal to the controller 225 via wired or wireless transmission via techniques as described herein.

The BHA 210 may also include a MWD shock/vibration sensor 245 that is configured to detect shock and/or vibration in the MWD portion of the BHA 210, and that may be substantially similar to the shock/vibration sensor 170b shown in FIG. 1. The shock/vibration data detected via the MWD shock/vibration sensor 245 may be sent via electronic signal to the controller 225 via wired or wireless transmission.

The BHA 210 may also include a mud motor ΔP sensor 250 that is configured to detect a pressure differential value or range across the mud motor of the BHA 210, and that may be substantially similar to the mud motor ΔP sensor 172a shown in FIG. 1. The pressure differential data detected via the mud motor ΔP sensor 350 may be sent via electronic signal to the controller 225 via wired or wireless transmission. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 255 and a gravity toolface sensor 260 that are cooperatively configured to detect the current toolface, and that collectively may be substantially similar to the toolface sensor 170c shown in FIG. 1. The magnetic toolface sensor 255 may be or include a conventional or future-developed magnetic toolface sensor which detects toolface orientation relative to magnetic north or true north. The gravity toolface sensor 260 may be or include a conventional or future-developed gravity toolface sensor which detects toolface orientation relative to the Earth's gravitational field. In an exemplary embodiment, the magnetic toolface sensor 255 may detect the current toolface when the end of the wellbore is less than about 7° from vertical, and the gravity toolface sensor 260 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., sensors 255 and/or 260) may be sent via electronic signal to the controller 225 via wired or wireless transmission.

The BHA 210 may also include a MWD torque sensor 265 that is configured to detect a value or range of values for torque applied to the bit by the motor(s) of the BHA 210, and that may be substantially similar to the torque sensor 172b shown in FIG. 1. The torque data detected via the MWD torque sensor 265 may be sent via electronic signal to the controller 225 via wired or wireless transmission.

The BHA 210 may also include an MWD WOB sensor 270 that is configured to detect a value or range of values for WOB at or near the BHA 210, and that may be substantially similar to the WOB sensor 170d shown in FIG. 1. The WOB data detected via the MWD WOB sensor 270 may be sent via electronic signal to the controller 225 via wired or wireless transmission.

The BHA 210 may also include a speed sensor 273 that is configured to detect configured to detect a value or range of the rotational speed of a drill bit (e.g., drill bit 170), and that may be substantially similar to the speed sensor 172c shown in FIG. 1. The rotational speed data detected by the speed sensor may be sent via electronic signal to the controller 225 via wired or wireless transmission.

The drawworks 220 includes a controller 290 and/or other means for controlling feed-out and/or feed-in of a drilling line (such as the drilling line 125 shown in FIG. 1). Such control may include rotational control of the drawworks (in vs. out) to control the height or position of the hook, and may also include control of the rate the hook ascends or descends. However, exemplary embodiments within the scope of the present disclosure include those in which the drawworks drill string feed off system may alternatively be a hydraulic ram or rack and pinion type hoisting system rig, where the movement of the drill string up and down is via something other than a drawworks. The drill string may also take the form of coiled tubing, in which case the movement of the drill string in and out of the hole is controlled by an injector head which grips and pushes/pulls the tubing in/out of the hole. Nonetheless, such embodiments may still include a version of the controller 290, and the controller 290 may still be configured to control feed-out and/or feed-in of the drill string.

The drive system 215 includes a surface torque sensor 275 that is configured to detect a value or range of the reactive torsion of the quill or drill string, much the same as the torque sensor 140a shown in FIG. 1. The drive system 215 also includes a quill position sensor 280 that is configured to detect a value or range of the rotational position of the quill, such as relative to true north or another stationary reference. The surface torsion and quill position data detected via sensors 275 and 280, respectively, may be sent via electronic signal to the controller 225 via wired or wireless transmission. The drive system 215 also includes a controller 285 and/or other means for controlling the rotational position, speed and direction of the quill or other drill string component coupled to the drive system 215 (such as the quill 145 shown in FIG. 1).

In an exemplary embodiment, the drive system 215, controller 285, and/or other component of the apparatus 200 may include means for accounting for friction between the drill string and the wellbore. For example, such friction accounting means may be configured to detect the occurrence and/or severity of the friction, which may then be subtracted from the actual "reactive" torque, perhaps by the controller 285 and/or another control component of the apparatus 200.

The controller 225 is configured to receive one or more of the above-described parameters from the user interface 205, the BHA 210, and/or the drive system 215 and drawworks 220, and utilize such parameters to continuously, periodically, or otherwise determine the current toolface orientation. The controller 225 may be further configured to generate a control signal, such as via intelligent adaptive control, and provide the control signal to the drive system 215 and/or the drawworks 220 to adjust, optimize, and/or maintain the toolface orientation. For example, the controller 225 may execute the method 300 shown in FIG. 3 to provide one or more signals to the drive system 215 and/or the drawworks 220 to increase or decrease WOB and/or quill position, such as may be required to accurately "steer" the drilling operation. In another example, the controller 225 may execute the method 300 to provide or update one or more algorithms used to control toolface orientation.

Moreover, as in the exemplary embodiment depicted in FIG. 2, the controller 285 of the drive system 215 and/or the controller 290 of the drawworks 220 may be configured to generate and transmit a signal to the controller 225. Consequently, the controller 285 of the drive system 215 may be configured to influence the control of the BHA 210 and/or the drawworks 220 to assist in obtaining and/or maintaining a desired toolface orientation and/or minimizing shock and vibration. Similarly, the controller 290 of the drawworks 220 may be configured to influence the control of the BHA 210 and/or the drive system 215 to assist in obtaining and/or maintaining a desired toolface orientation and/or minimizing shock and vibration. Alternatively, or additionally, the controller 285 of the drive system 215 and the controller 290 of the drawworks 220 may be configured to communicate directly, such as indicated by the dual-directional arrow 292 depicted in FIG. 2. Consequently, the controller 285 of the drive system 215 and the controller 290 of the drawworks 220 may be configured to cooperate in obtaining and/or maintaining a desired toolface orientation and/or minimizing shock and vibration. Such cooperation may be independent of control provided to or from the controller 225 and/or the BHA 210.

In an exemplary embodiment, the controller 225 receives DP data from one or both of the mud motor pressure sensor 250 and a pump pressure sensor or gauge (not shown) (or may be determined at the surface by the calculations mentioned above with respect to the mud motor pressure sensor 250) and determines a relationship of the DP data to the toolface. As another alternative, measurement data from a mud pump 180 (illustrated in FIG. 1) may be provided for the DP data (whether directly or derived therefrom). The DP data may be useful, for example, in determining WOB while the drilling rig apparatus 100 is engaged in directional drilling. In certain embodiments, the controller 225 and/or a portion thereof may be located on the BHA 210.

Figure 3:
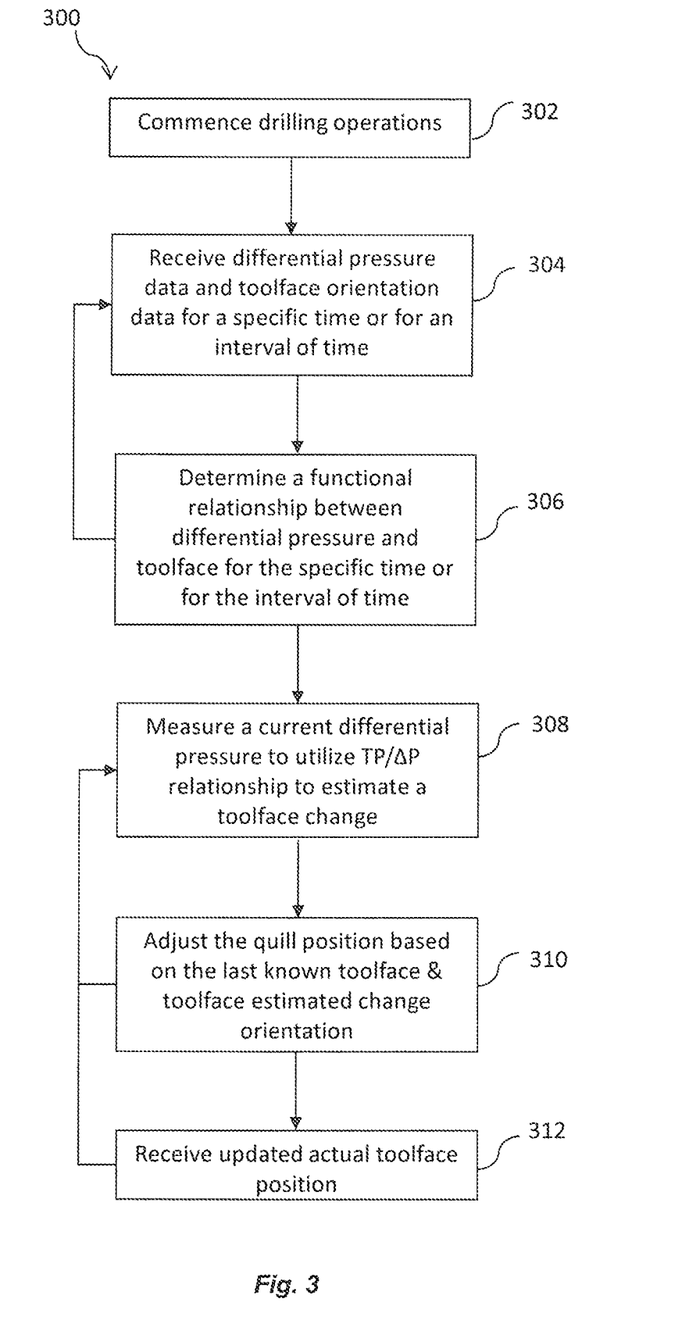
FIG. 3 is an exemplary flow chart showing an exemplary process for directional drilling according to one or more aspects of the present disclosure.

FIG. 3 is a flow chart showing an exemplary method 300 for directional drilling according to aspects of the present disclosure. The method 300 may be performed, for example, with respect to any of the controllers and the apparatus 100 components discussed above with respect to FIGS. 1 and 2. In certain exemplary embodiments, the method 300 may be partially or fully performed by one or more controllers located on the BHA 170, such as the controller 190b. It is understood that additional steps can be provided before, during, and after the steps of method 300.

At block 302, drilling operations (whether vertical or some form of directional drilling) commence at the apparatus 100 described in FIG. 1. For example, the drilling operations may commence according to predetermined or input commands pertaining to speed of operation/a desired rate of penetration.

At block 304, DP data and toolface orientation data is received by controller 190b for a specific time or for an interval of time (e.g., every 10-30 minutes). For example, DP data may be obtained by the mud motor ΔP sensor 172a of the BHA 170 and provided to the controller 190b for further processing, and toolface orientation data (e.g., gravity-based toolface orientation data and/or magnetic-based toolface orientation data) may be obtained from toolface sensor 170c and provided to controller 190b for further processing. Alternatively, the DP may be calculated, detected, or otherwise determined at the surface, such as by calculating the difference between the surface standpipe pressure just off-bottom and pressure once the bit touches bottom and starts drilling and experiencing torque. At least two data points (each data point including a value of DP and the corresponding toolface orientation) is obtained. In several embodiments, DP data and toolface orientation data is received on a continuous, on-going, or recurring basis.

At block 306, a functional relationship between DP and toolface orientation for the specific time or for the interval of time is determined by controller 190b. DP may be proportional to or otherwise related to toolface orientation.

In an exemplary embodiment, the data points obtained in block 304 are fitted to a curve. For example, the two data points may be fitted to a curve to determine the relationship. In some embodiments, multiple data points are obtained and fitted to a curve. In various embodiments, the DP and/or toolface orientation values are averaged over a certain period or certain interval of time. Each value of toolface orientation can be plotted against its corresponding DP value to generate a curve (linear, polynomial, multipoint, best-fit, etc.). The plotted points illustrate a relationship between the DP and toolface orientation for that specific time or specific interval of time. In one embodiment, the relationship can be expressed in an equation or as a mathematical function through, for example, one or more linear, polynomial or logarithmic equations.

In certain embodiments, the functional relationship determined in block 306 may be communicated to a surface controller such as controller 190a. After determining the functional relationship, the relationship may be communicated to the surface controller via, for example, telemetry. Additionally, in certain embodiments, the downhole system compares the currently determined relationship to one or more previously communicated relationships. In certain such embodiments, a newly determined relationship may not be communicated if the relationship is substantially similar to the previously communicated relationship. During and/or after communicating the functional relationship to the controller 190*a*, the other steps of method 300 may continue to be performed.

Certain other embodiments may determine functional relationships between one or more other parameters, and data directed to one or more such other parameters may be correspondingly received in block 304. For example, such embodiments may determine functional relationships between measured weight-on-bit (WOB) and measured shock and vibration of a drill bit, measured rotations per minute (RPM) of a drill bit and measured shock and vibration, measured WOB and measured rate of penetration (ROP), and/or other such relationships.

At block 308, once the relationship between DP and toolface orientation is known, a current DP is measured to estimate a toolface change. In certain embodiments, the current DP may be a surface DP. In an embodiment, the controller 190 takes the current DP value and estimates the value of the current toolface orientation based on the previously acquired or measured data points and the functional relationship between DP and toolface orientation. For example, the value of the current DP can be input into the previously obtained equation (e.g., the relationship determined in block 306) to output current toolface orientation. Certain additional embodiments may determine further downhole parameters from the relationship and the current DP and/or one or more other surface parameters.

At block 310, the value of the estimated current toolface orientation is used to adjust the toolface. The toolface can be adjusted at the surface using the top drive 140, the drawworks 130, and/or the quill 145. For example, the position of the quill 145 may be adjusted based on the last known toolface and the estimated toolface change. In various embodiments, the controller 190 automatically adjusts the toolface, and in other embodiments, the controller 190 instructs the directional driller to adjust the toolface. In yet other embodiments, the top drive 140 automatically adjusts the current toolface orientation to a desired toolface orientation on a recurring basis. For example, the top drive 140 may adjust the current toolface orientation periodically, such as, as a non-limiting example, after a time period of from about 0.01 seconds to about 5 minutes. In varying embodiments, the adjustment may occur after about 0.1 seconds to about 1 minute, or about 1 second to about 30 seconds. In other embodiments, the adjustment may occur after about 0.05 seconds to about 10 seconds, or after about 0.1 seconds, after about 0.5 seconds, after about 1 second, after about 2 seconds, after about 5 seconds, or any range including the above-noted time delays.) The value that the toolface was adjusted (e.g., the change in position of the quill 145 commanded in block 310) may be used, along with, for example, the actual toolface position determined in block 312, to determine and/or further refine the functional relationship between DP and toolface orientation in block 306 and 308.

In other embodiments that determine functional relationships between one or more other parameters, data directed to one or more such other parameters may be measured in block 308. For example, such embodiments may measure WOB, RPM of the drill bit, and/or other such measurements. The top drive 140, the drawworks 130, and/or the quill 145 may then be adjusted in block 310 responsive to such measurements.

At block 312, data indicating an actual toolface position may be received from one or more sensors coupled to the BHA 170 by the controller 190. The data indicating the actual toolface position may be used to estimate the toolface change in block 308 and/or used to further refine the functional relationship between DP and toolface orientation determined in block 306. Certain other embodiments may, alternatively or additionally, also receive data direction to other parameters, such as shock and vibration.

Any combination of blocks 304-312 may be repeated any number of times so that the most current relationship between DP and toolface orientation is used to control the toolface. In certain embodiments, blocks 308, 310, and/or 312 may be repeated continuously using the most up to date functional relationship determined in block 306. Additionally, blocks 304 and 306 may be performed after the occurrence of a trigger condition such as a time duration and/or other trigger condition. In several embodiments, the relationship between DP and toolface orientation calculated in block 306 may be updated every couple of minutes (e.g., 10 minutes). As such, the measurements, functional relationships, and/or other parameters may be determined or performed periodically and for a certain interval of time. Additional techniques for directional drilling using the systems, devices, and methods described herein are disclosed in co-pending U.S. patent application Ser. No. 15/478,265, filed Apr. 4, 2017, which is hereby incorporated herein in its entirety by express reference thereto.

Advantageously, the control system for toolface control can be optimized using recent, measured data and continually refined instead of relying on the intuition of an experienced directional driller. This allows for more accurate toolface control. In addition to improved, automated control, this feedback can allow the directional driller to refine his estimation and improve his performance while manually controlling the toolface. This type of benefit can apply to other types of control as well where downhole data can measure or provide optimized parameters for rig equipment control systems.

In some embodiments, the relationship between WOB and shock and vibration and/or the relationship between RPM of the bit and shock and vibration is determined in a similar fashion as described in FIG. 3. Generally, the drill string undergoes various types of vibration during drilling, including axial (longitudinal) vibrations, bending (lateral) vibrations, and torsional (rotational) vibrations. The torsional vibrations are caused by nonlinear interaction between the bit, the drill string, and the wellbore. This torsional vibration can include stick-slip vibration, characterized by alternating stops (during which the BHA "sticks" to the wellbore) and intervals of large angular velocity of the BHA (during which the BHA "slips" relative to the wellbore).

Shock and vibration, WOB, and RPM measurements allow drillers to properly identify conditions and correct unwanted dynamics that lead to BHA failure and hole damage, thus minimizing the cost of the well significantly through decreased drilling time by reducing BHA trips, increasing the drilling rate of penetration (ROP), and improved overall well conditions. Adjustment of drilling parameters based upon real-time monitoring of the dynamic loads in the drilling BHA are desirable to help achieve the objective of wellbore completion in the shortest possible time.

Generally, optimal drilling is obtained when the ROP of the drill bit into the formation is as high as possible while the vibration is as low as possible. Typically, reducing the WOB or reducing the rotary speed of the drill bit reduces vibration. Similarly, reducing WOB generally mitigates stick-slip. Increasing RPM generally helps to keep drill string/bit friction in the dynamic range and helps overcome the formation friction factor to minimize stick-slip. These relationships can change, however, based on a number of other factors. Running high RPM with low WOB can put the drill bit and/or BHA in forward whirl vibration. Forward and backward whirl can increase the shock load(s) on drilling bit, BHA, and MWD equipment, thus prematurely damaging them. Keeping a suitable RPM vs. WOB relation in an ordinary operating range as determinable by those of ordinary skill in the art should minimize or entirely prevent such damaging vibrations.

Accordingly, in various embodiments, the shock and vibration and WOB are measured for a specific time or for an interval of time. For example, the shock/vibration sensor 170b may provide shock and/or vibration data to controller 190b and the WOB sensor 140c or the WOB sensor 170d may provide WOB data to controller 190b. Based on this data, the controller 190b determines a relationship between WOB and shock and vibration for the specific time or for the interval of time. In certain embodiments, the controller 190b formulates an algorithm or mathematical equation to describe this relationship. In other words, the controller 190b tries to map an input (WOB) to an output (shock and vibration). Once the algorithm is formulated, the controller 190b can use the algorithm to adjust WOB to minimize shock and vibration and/or stick-slip.

In some embodiments, the shock and vibration and RPM of the bit are measured for a specific time or for an interval of time. For example, the shock/vibration sensor 170b may provide shock and/or vibration data to controller 190 and speed sensor 172c may provide rotary speed data to controller 190. The controller 190 can then use this data to determine the relationship between RPM and shock and vibration, and formulate an algorithm that describes the relationship for that moment in time or interval of time. The algorithm can then be used to adjust the RPM to minimize shock and vibration and/or stick-slip.

In exemplary embodiments, the MWD tool is programmed with an algorithm to track the desired conditions (e.g., DP, WOB, RPM, and/or shock and vibration) in the measured data. The MWD tool is also preferably configured in a way that the telemetry can transmit updated parameters either periodically or under a specific condition (such as once per connection, once per new observation, parameters changed by more than a certain amount to last transmitted values, etc.). The rig control system can then be updated either by user entry or by updating the toolface control software to automatically accept the values from the downhole telemetry channel.

Figure 4:
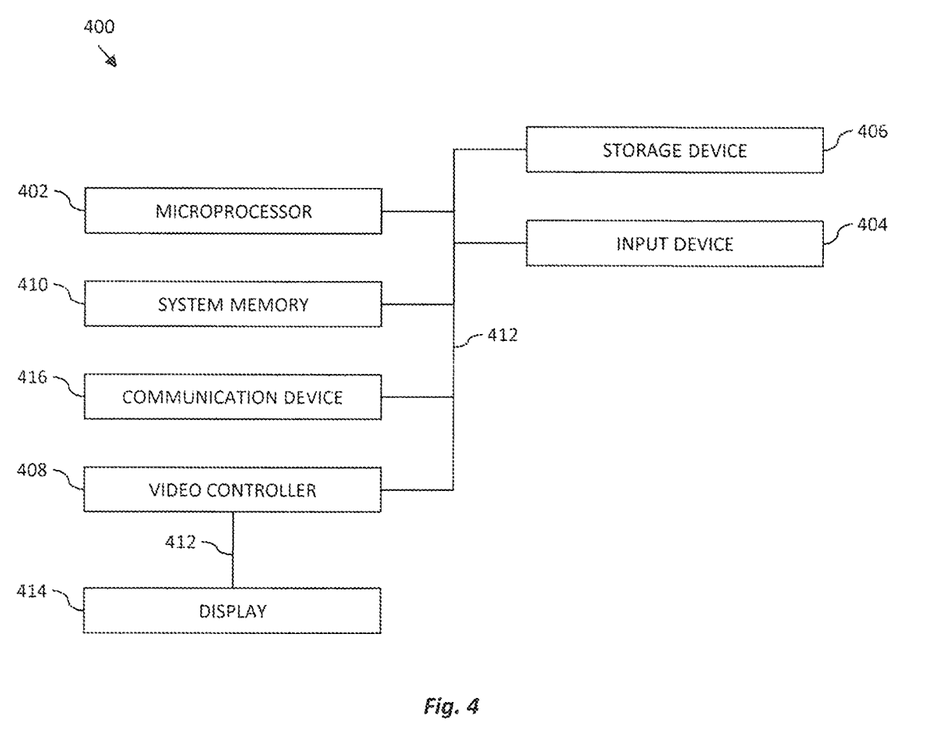
FIG. 4 is a diagram of an exemplary system for implementing one or more embodiments of the described devices, systems, or methods according to one or more aspects of the present disclosure.

Referring now to FIG. 4, illustrated is an exemplary system 400 for implementing one or more embodiments of at least portions of the devices and/or methods described herein. The system 400 includes a processor 402, an input device 404, a storage device 406, a video controller 408, a system memory 410, a display 414, and a communication device 416, all interconnected by one or more buses 412. The storage device 406 may be a floppy drive, hard drive, CD, DVD, optical drive, or any other form of storage device. In addition, the storage device 406 may be capable of receiving a floppy disk, CD, DVD, or any other form of computer-readable medium that may contain computer-executable instructions. Communication device 416 may be a modem, network card, wireless router, or any other device to enable the system 400 to communicate with other systems.

A computer system typically includes at least hardware capable of executing machine readable instructions, as well as software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, PDAs, and personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. Hardware may also include, at least within the scope of the present disclosure, multi-modal technology, such as those devices and/or systems configured to allow users to utilize multiple forms of input and output—including voice, keypads, and stylus—interchangeably in the same interaction, application, or interface.

Software may include any machine code stored in any memory medium, such as RAM or ROM, machine code stored on other devices (such as floppy disks, CDs or DVDs, for example), and may include executable code, an operating system, as well as source or object code, for example. In addition, software may encompass any set of instructions capable of being executed in a client machine or server—and, in this form, is often called a program or executable code.

Hybrids (combinations of software and hardware) are becoming more common as devices for providing enhanced functionality and performance to computer systems. A hybrid may be created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system herein, and are thus envisioned by the present disclosure as possible equivalent structures and equivalent methods.

Computer-readable mediums may include passive data storage such as a random access memory (RAM), as well as semi-permanent data storage such as a compact disk or DVD. In addition, an embodiment of the present disclosure may be embodied in the RAM of a computer and effectively transform a standard computer into a new specific computing machine.

Data structures are defined organizations of data that may enable an embodiment of the present disclosure. For example, a data structure may provide an organization of data or an organization of executable code (executable software). Furthermore, data signals are carried across transmission mediums and store and transport various data structures, and, thus, may be used to transport an embodiment of the invention. It should be noted in the discussion herein that acts with like names may be performed in like manners, unless otherwise stated.

The controllers and/or systems of the present disclosure may be designed to work on any specific architecture. For example, the controllers and/or systems may be executed on one or more computers, Ethernet networks, local area networks, wide area networks, internets, intranets, hand-held and other portable and wireless devices and networks.

In view of all of the above and the figures, one of ordinary skill in the art will readily recognize that the present disclosure relates to systems and methods for directional drilling. In one aspect, the present disclosure is directed to a system including a bottom hole assembly (BHA) controller and a surface controller. The BHA controller is associated with one or more downhole sensors and is configured to receive data from the one or more downhole sensors, determine a relationship from the data from the one or more downhole sensors, and communicate the relationship to a surface controller. The surface controller is configured to receive the relationship communicated from the BHA controller, receive data from one or more surface sensors, and provide control signals to a drilling system responsive to the relationship and the data received from the one or more surface sensors.

In a second aspect, the present disclosure is directed to a method of directional drilling that includes receiving, by a bottom hole assembly (BHA) controller, data from the one or more downhole sensors, determining, by the BHA controller, a relationship from the data from the one or more downhole sensors, communicating, by the BHA controller, the relationship to a surface controller, receiving, by the surface controller, the relationship communicated from the BHA controller, receiving, by the surface controller, data from one or more surface sensors; and providing, by the surface controller, control signals to a drilling system responsive to the relationship and the data received from the one or more surface sensors.

In a third aspect, the present disclosure is directed to a non-transitory machine-readable medium having stored thereon machine-readable instructions executable to cause a machine to perform certain operations. The operations include receiving data from the one or more downhole sensors, determining a relationship from the data from the one or more downhole sensors, and communicating the relationship to a surface controller such that the surface controller can determine control signals to a drilling system responsive to the relationship and the data received from one or more surface sensors The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A system comprising:
    a bottom hole assembly (BHA) controller associated with one or more downhole sensors and configured to:
        receive data from the one or more downhole sensors,
        determine a relationship from the data from the one or more downhole sensors, wherein the relationship is between at least one of a:
            (i) measured differential pressure (DP) and measured toolface orientation;
            (ii) measured weight-on-bit (WOB) and measured shock and vibration of a drill bit:
            (iii) measured rotations per minute (RPM) of a drill bit and measured shock and vibration, wherein the relationship is determined for an interval of time; or
            (iv) measured WOB and measured rate of penetration, and communicate the relationship to a surface controller; and
    the surface controller configured to:
        receive the relationship communicated from the BHA controller,
        receive data from one or more surface sensors, and
        provide control signals to a drilling system responsive to the relationship and the data received from the one or more surface sensors.

2. The system of claim 1, wherein the surface controller is further configured to:
    estimate at least one of a current toolface orientation, a current shock and a vibration of the drill bit, or rate of penetration using at least the data from the one or more surface sensors and the relationship.

3. The system of claim 1, wherein the control signals adjust at least one of a WOB, a current RPM, a rate of penetration, a quill position, or a toolface position, or any combination thereof.

4. The system of claim 1, wherein the surface controller is further configured to receive data from the one or more downhole sensors and wherein the control signals are provided responsive to the relationship and the data received from the one or more surface sensors and the one or more downhole sensors.

5. The system of claim 1, wherein the data from the one or more surface sensors is directed to at least one of a current DP, WOB, or RPM.

6. The system of claim 1, further comprising a BHA comprising the BHA controller and at least one of the one or more downhole sensors.

7. The system of claim 1, further comprising:
    a top drive system configured to:
        receive the control signals from the surface controller, and
        based on the control signals, adjust at least one of a WOB, a current RPM, a rate of penetration, a quill position, or a toolface position, or any combination thereof.

8. The system of claim 7, further comprising a drawworks in operable association with the top drive system, wherein the drawworks and the top drive system are configured to:
    receive the control signals from the surface controller, and
    based on the control signals, adjust a current toolface orientation to a desired toolface orientation.

9. The system of claim 1, wherein the surface controller is further configured to provide or update an algorithm that controls operation of at least one of a BHA or a top drive system responsive to receiving the relationship and the data from the one or more surface sensors.

10. The system of claim 1, wherein determining the relationship comprises at least one of:

(i) fitting measured DP data to measured toolface orientation data on a curve,
(ii) fitting measured WOB data to shock and vibration data on a curve, or
(iii) fitting measured RPM data to measured shock and vibration data on a curve.

11. The system of claim 1, wherein the relationship is expressed as a mathematical function or equation.

12. The system of claim 11, wherein the relationship is determined by inputting a current DP, WOB, or RPM, or any combination thereof, into the mathematical function or equation to output a current toolface orientation, a current shock and vibration of the drill bit, or a rate of penetration, or any combination thereof.

13. A method of directional drilling comprising:
receiving, by a bottom hole assembly (BHA) controller, data from one or more downhole sensors;
determining, by the BHA controller, a relationship from the data from the one or more downhole sensors, wherein the relationship is between at least one of a:
(i) measured differential pressure (DP) and measured toolface orientation;
(ii) measured weight-on-bit (WOB) and measured shock and vibration of a drill bit;
(iii) measured rotations per minute (RPM) of a drill bit and measured shock and vibration, wherein the relationship is determined for an interval of time; or
(iv) measured WOB and measured rate of penetration;
communicating, by the BHA controller, the relationship to a surface controller;
receiving, by the surface controller, the relationship communicated from the BHA controller;
receiving, by the surface controller, data from one or more surface sensors; and
providing, by the surface controller, control signals to a drilling system responsive to the relationship and the data received from the one or more surface sensors.

14. The method of claim 13, further comprising:
estimating, by the surface controller, at least one of a current toolface orientation, a current shock and vibration of the drill bit, or a rate of penetration using at least the data from the one or more surface sensors and the relationship.

15. The method of claim 13, wherein the control signals adjust at least one of a WOB, a current RPM, a rate of penetration, a quill position, or a toolface position, or any combination thereof.

16. The method of claim 13, wherein the data from the one or more surface sensors is directed to at least one of a current DP, WOB, or RPM.

17. The method of claim 13, wherein determining the relationship comprises at least one of:
(i) fitting measured DP data to measured toolface orientation data on a curve,
(ii) fitting measured WOB data to shock and vibration data on a curve, or
(iii) fitting measured RPM data to measured shock and vibration data on a curve.

18. The method of claim 13, wherein the relationship is expressed as a mathematical function or equation, and wherein the relationship is determined by inputting a current DP, WOB, or RPM, or any combination thereof, into the mathematical function or equation to output a current toolface orientation, a current shock and vibration of a drill bit, or rate of penetration, or any combination thereof.

19. A non-transitory machine-readable medium having stored thereon machine-readable instructions executable to cause a downhole controller to perform operations comprising:
receiving data from one or more downhole sensors;
determining a relationship from the data from the one or more downhole sensors, wherein the relationship is between at least one of a:
(i) measured differential pressure (DP) and measured toolface orientation;
(ii) measured weight-on-bit (WOB) and measured shock and vibration of a drill bit;
(iii) measured rotations per minute (RPM) of a drill bit and measured shock and vibration, wherein the relationship is determined for an interval of time; or
(iv) measured WOB and measured rate of penetration; and
communicating the relationship to a surface controller such that the surface controller can determine control signals to a drilling system responsive to the relationship and the data received from one or more surface sensors.

20. The non-transitory machine-readable medium of claim 19, wherein determining the relationship comprises at least one of:
(i) fitting measured DP data to measured toolface orientation data on a curve,
(ii) fitting measured WOB data to shock and vibration data on a curve, or
(iii) fitting measured RPM data to measured shock and vibration data on a curve.

21. The non-transitory machine-readable medium of claim 19, wherein the relationship is determined by inputting a current DP, WOB, or RPM, or any combination thereof, into a mathematical function or equation to output a current toolface orientation, a current shock and vibration of a drill bit, or a rate of penetration, or any combination thereof.

* * * * *

UNITED STATES PATENT AND TRADEMARK OFFICE
CERTIFICATE OF CORRECTION

PATENT NO. : 10,364,666 B2
APPLICATION NO. : 15/590784
DATED : July 30, 2019
INVENTOR(S) : Bosko Gajic et al.

Page 1 of 1

It is certified that error appears in the above-identified patent and that said Letters Patent is hereby corrected as shown below:

In the Claims

Claim 1 at Column 16, Line 11: Please change ":" to --;--

Signed and Sealed this
Twenty-second Day of October, 2019

Andrei Iancu
*Director of the United States Patent and Trademark Office*